(12) United States Patent
Kim et al.

(10) Patent No.: US 7,545,512 B2
(45) Date of Patent: Jun. 9, 2009

(54) METHOD FOR AUTOMATED MEASUREMENT OF THREE-DIMENSIONAL SHAPE OF CIRCUIT BOARDS

(75) Inventors: Min Young Kim, Seoul (KR); Hee Tae Kim, Gyeonggi-do (KR); Byung Min Yoo, Gyeonggi-do (KR); Se Hyun Han, Chungcheongnam-do (KR); Seung Jun Lee, Seoul (KR)

(73) Assignee: Koh Young Technology Inc., Seoul (KR)

( * ) Notice: Subject to any disclaimer, the term of this patent is extended or adjusted under 35 U.S.C. 154(b) by 0 days.

(21) Appl. No.: 11/656,458

(22) Filed: Jan. 23, 2007

(65) Prior Publication Data

US 2007/0177159 A1 Aug. 2, 2007

(30) Foreign Application Priority Data

Jan. 26, 2006 (KR) .................. 10-2006-0008479
Jan. 26, 2006 (KR) .................. 10-2006-0008480

(51) Int. Cl.
*G01B 11/02* (2006.01)
(52) U.S. Cl. ............... 356/514; 356/511; 356/500
(58) Field of Classification Search ........... 356/601, 356/237.2–237.6, 511–516
See application file for complete search history.

(56) References Cited

U.S. PATENT DOCUMENTS

| 4,802,759 | A | | 2/1989 | Matsumoto et al. | |
|---|---|---|---|---|---|
| 5,496,337 | A | * | 3/1996 | Brown | 606/148 |
| 6,104,493 | A | * | 8/2000 | Fuse et al. | 356/627 |
| 6,362,877 | B1 | * | 3/2002 | Kobayashi et al. | 356/237.5 |
| 2008/0266574 | A1 | * | 10/2008 | Groot et al. | 356/511 |

* cited by examiner

*Primary Examiner*—L. G Lauchman
*Assistant Examiner*—Rebecca C Slomski
(74) *Attorney, Agent, or Firm*—Rosenberg, Klein & Lee

(57) ABSTRACT

A method of measuring a 3D shape includes the steps of measuring a brightness of a first illumination source 41a, measuring a phase-to-height conversion factor, measuring a 3D shape of a circuit board 62 according to the normal inspection mode, and determining whether bare board information about the circuit board 62 is included. If the information is not included, performing bare board teaching to acquire the information. Then, the 3D shape of target objects on the circuit board 62 are measured, when the bare board information is included or bare board teaching information is generated. Next, the circuit board 62 is analyzed to determine if it is normal or abnormal by using 3D shape information.

21 Claims, 12 Drawing Sheets

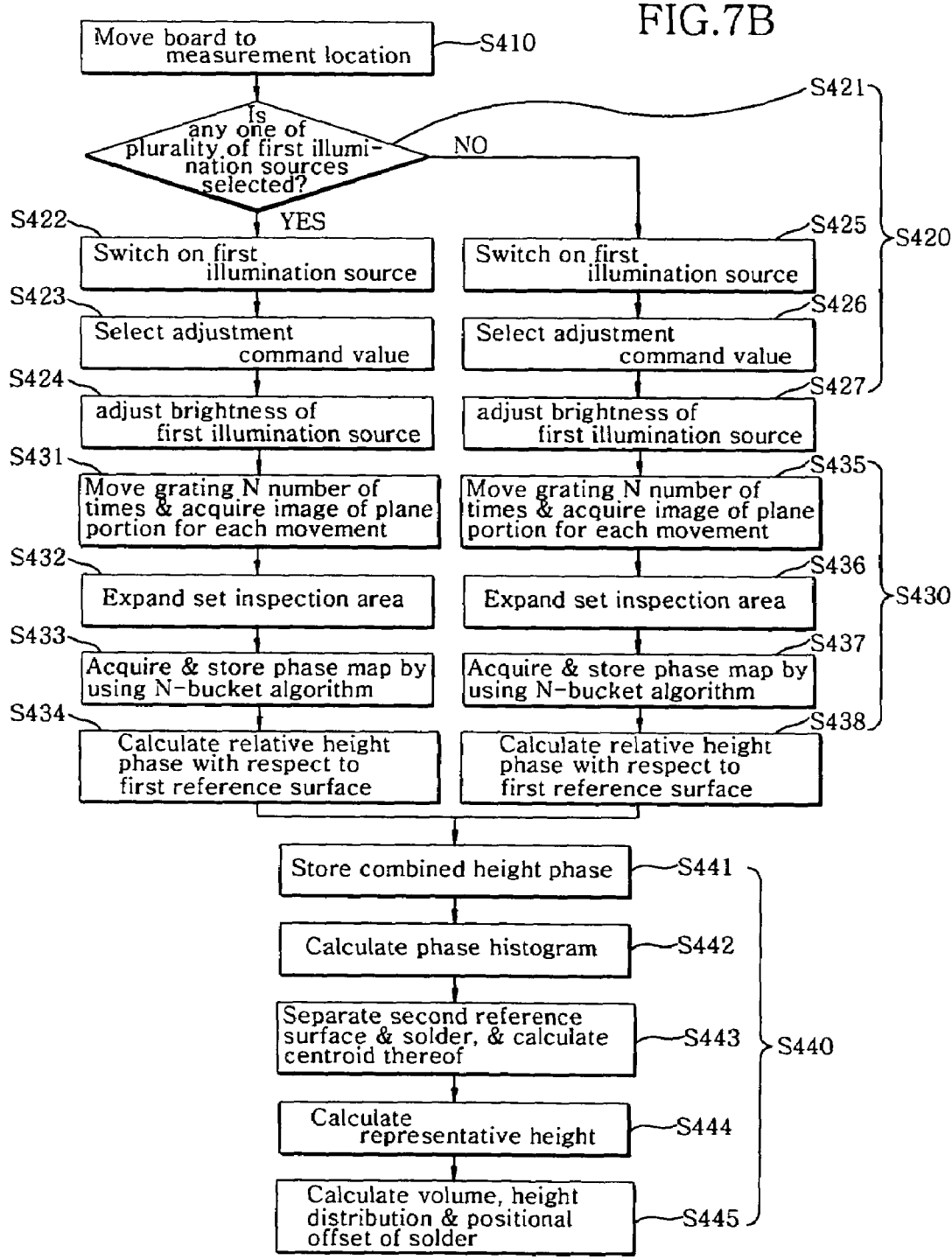

METHOD FOR AUTOMATED MEASUREMENT OF THREE-DIMENSIONAL SHAPE OF CIRCUIT BOARDS

BACKGROUND OF THE INVENTION

1. Field of the Invention

A method of measuring a 3D shape, which can measure 3D shape of target objects on a circuit board by searching a database for information on the bare board (the circuit board with no components mounted thereon) when the inspection option is set to the teaching-based inspection mode or by performing bare board teaching when the circuit board being inspected is from a supplier for which there is no bare board information.

2. Description of the Related Art

FIG. 1 is a flowchart illustrating a method of measuring a 3D shape according to the conventional art. Referring to FIG. 1, to measure a 3D shape of an object, in operation S10, an illuminated grating pattern is emitted towards a reference surface by emitting a light generated from an illumination source (not shown) towards a grating device (not shown) to acquire a reference phase corresponding to a reference surface. In operation S11, the grating is moved in a fine pitch increments using a piezoelectric actuator (not shown) and emitted towards the reference surface and a grating pattern image is acquired using a charged coupled device (CCD) camera and a frame grabber (not shown). In operation S12, when the grating pattern image is acquired by the frame grabber, a bucket algorithm is applied to the grating pattern image. In operation S13, the reference phase with respect to the reference surface is acquired.

In operation S15, when the reference phase corresponding to the reference surface is acquired, an object to be measured is placed on a moving table and a light generated from the illumination source is emitted towards a surface being measured of the object to be measured to acquire a phase of the object to be measured. In operation S16, the grating is moved by a fine increment using the piezoelectric actuator to apply the bucket algorithm, and the grating pattern image reflected from the surface being measured is acquired via the CCD camera and the frame grabber. In operation S17, the bucket algorithm is applied to the grating pattern image. In operation S18, an object phase of the object being measured is acquired.

When the object phase is acquired, the object phase is subtracted from the reference phase in operation S20, and a moire phase is acquired in operation S21. When the moire phase is acquired, the moire phase is unwrapped in operation S22, and actual height information of the object being measured is acquired by using a result of the unwrapping. Through the above-described operations, the 3D shape of the object being measured is acquired.

However, the conventional 3D shape measuring method has a problem in that since each of the measuring conditions is manually calculated and then the measurement is performed, when there is a totally new object being measured, the operator becomes tired and then less productive.

SUMMARY OF THE INVENTION

An objective of the present invention is to provide a method of measuring a 3D shape of target objects according to the normal inspection mode when an object to be measured is set to the normal inspection mode. The method also is capable of measuring the 3D shape of target objects on a circuit board by searching a database for information on the bare board when the inspection option is set to the teaching-based inspection mode or by performing bare board teaching when the circuit board is inspected from a supplier not having bare board information for the circuit board, and thereby the method can improve a productivity of an electronic circuit board manufacturing line.

Another objective of the present invention is to improve the measurement quality of the 3D shape measurement of target objects by measuring their 3D shape with a standardized brightness of an illumination source at illumination levels which are predefined prior to the machine operation.

To accomplish the above objects of the present invention, there is provided a method of measuring a 3 dimensional (3D) shape, the method including: measuring a brightness of a first illumination source by controlling, via a central control unit, a module control unit and an image acquisition unit; measuring a phase-to-height conversion factor by controlling via the central control unit the module control unit and the image acquisition unit after the brightness measuring process of the first illumination source is completed; determining whether the measurement is performed in a normal inspection mode after the brightness of the first illumination source and the phase-to-height conversion factor are measured and calculated; measuring a 3D shape of a circuit board according to the normal inspection mode by controlling, via the central control unit, the module control unit and the image acquisition unit when it is the normal inspection mode as a result of the determination; searching a database and determining, via the central control unit, whether bare board information about the circuit board is in the database when it is not the normal inspection mode as a result of the determination; performing bare board teaching by controlling, via the central control unit, the module control unit and the image acquisition unit when the bare board information is not in the database; measuring the 3D shape of the circuit board according to a teaching-based inspection mode by controlling, via the central control unit, the module control unit and the image acquisition unit when the bare board information is in the database or when bare board teaching information is generated by performing the bare board teaching; and analyzing via the central control unit whether 3D shape of target objects on the circuit board is normal or abnormal by using the measured 3D shape information of the objects according to the normal inspection mode and the teaching-based inspection mode.

BRIEF DESCRIPTION OF THE DRAWINGS

The above and other objects, features and advantages of the present invention will become apparent from the following description of a preferred embodiment given in conjunction with the accompanying drawings, in which:

FIGS. 7A and 7B are flowcharts illustrating an operation of measuring a 3D shape of a circuit board according to a normal inspection mode shown in FIG. 4;

DETAILED DESCRIPTION OF THE INVENTION

Preferred embodiments of the present invention will be described in detail with reference to the accompanying drawings.

Figure 1:
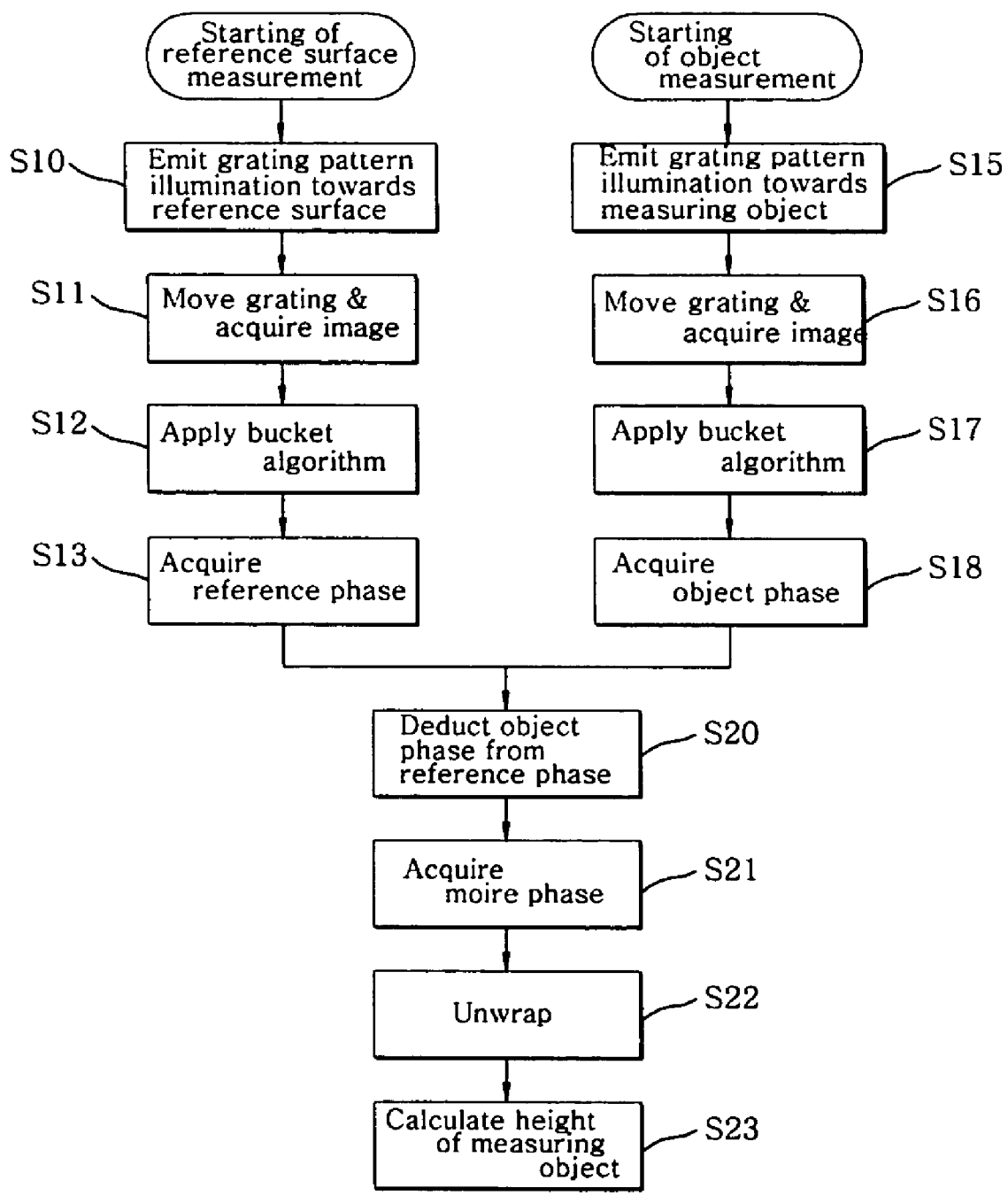
FIG. 1 is a flowchart illustrating a conventional method of measuring a 3D shape.
Figure 2:
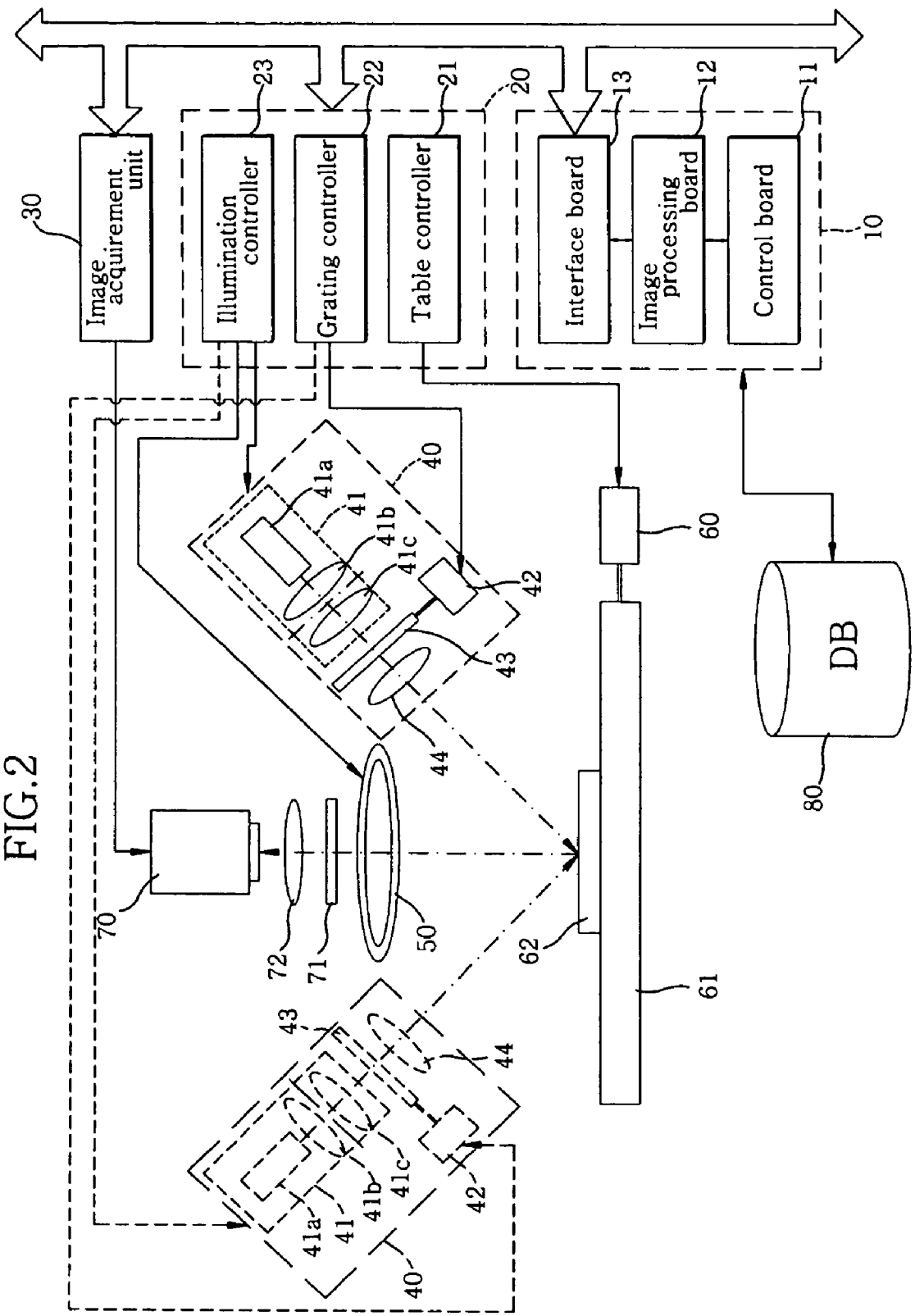
FIG. 2 is a diagram illustrating a 3D shape measuring system for a 3D shape measuring method according to the present invention.

FIG. 2 is a diagram illustrating a 3D shape measuring system for performing a 3D shape measuring method according to the present invention. As shown in FIG. 2, the 3D shape measuring apparatus includes a central control unit 10, a module control unit 20, an image acquisition unit 30, at least one pattern projector 40, a second illumination source 50, an X-Y table 61, a table moving device 60, and a camera 70. Hereinafter, a configuration of each element will be described.

A charge coupled device (CCD) camera or a complementary metal oxide semiconductor (CMOS) camera is utilized for the camera 70. A second illumination source 50, an optical filter 71, and a lens 72 are provided below the camera 70. A plurality of light emitting diodes (LEDs) arranged in the shape of a circle or a circular lamp is utilized for the second illumination source 50, and the second illumination source 50 is utilized as an illuminator to measure the particular shape of specific locations on a circuit board 62 or a bare board (a circuit board with no components mounted thereon) 63 which corresponds to an object to be measured.

The table moving device 60 drives the X-Y table 61 which is positioned below the camera 70 and thereby moves the circuit board 62, the bare board 63, or a calibration target 64 to predefined measurement locations so that the camera 70 may take images of the circuit board 62, the bare board 63 or the calibration target 64.

At least one pattern projector 40 of the 3D shape measuring system is provided. Each pattern projector 40 that is provided is inclined at a respective side of the camera 70, which takes images of the circuit board 62, the bare board 63 or the calibration target 64. In this instance, the pattern projector 40 includes an illumination part 41, a grating moving device 42, a grating device 43, and a lens 44. The illumination part 41 includes a first illumination source 41a and a plurality of lenses 41b and 41c. The illumination generated by the first illumination source 41a passes through the plurality of lenses 41b and 41c, and is emitted toward the grating device 43 and then toward the circuit board 62, the bare board 63 or the calibration target 64.

The image acquisition unit 30 receives the image obtained by the camera 70 and transmits the received image to the central control unit 10. The module control unit 20 includes a table controller 21, a grating controller 22, and an illumination controller 23. The illumination controller 23 controls the first illumination source 41a of the illumination part 41 or the second illumination source 50, the grating controller 22 controls the grating moving device 42, and the table controller 21 controls the table moving device 60.

The central control unit 10 includes a control circuit board 11, an image processing circuit board 12, and an interface circuit board 13. The central control unit 10 transmits/receives a control signal or control information to the module control unit 20 and the image acquisition unit 30 via the interface circuit board 13. The image processing circuit board 12 processes an image received from the image acquisition unit 30, and the control circuit board 11 generally controls the 3D shape measuring apparatus of the present invention. Also, the central control unit 10 searches a database 80 for the bare board information of a new circuit board supplier or stores the bare board information which is acquired in a teaching-based inspection mode.

Hereinafter, a method of measuring 3D shape of target objects on the circuit board 62 by using the 3D shape measuring system constructed as above will be described with reference to FIGS. 2 through 4.

Figure 3A:
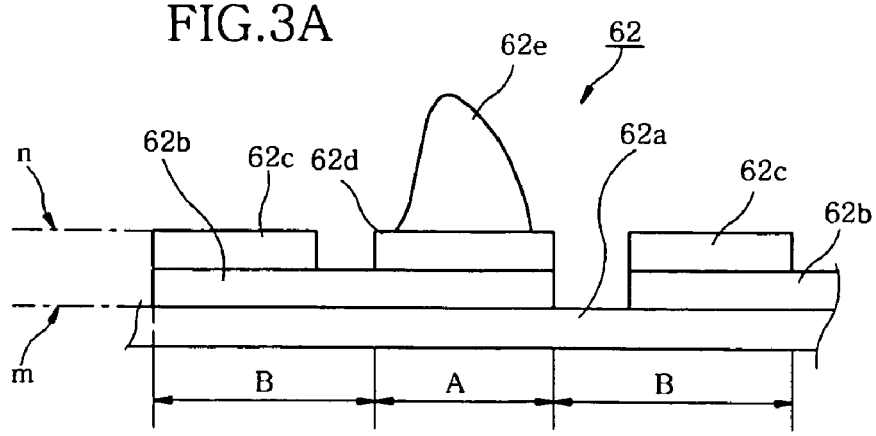
FIGS. 3A through 3C illustrate a configuration of a circuit board, a bare circuit board, and a calibration target.
Figure 3B:
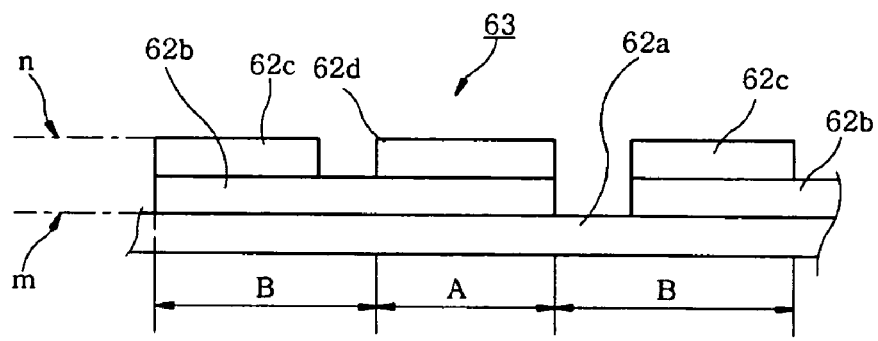
Figure 3C:
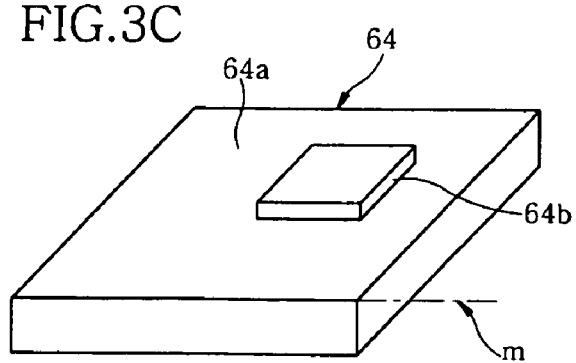
Figure 4:
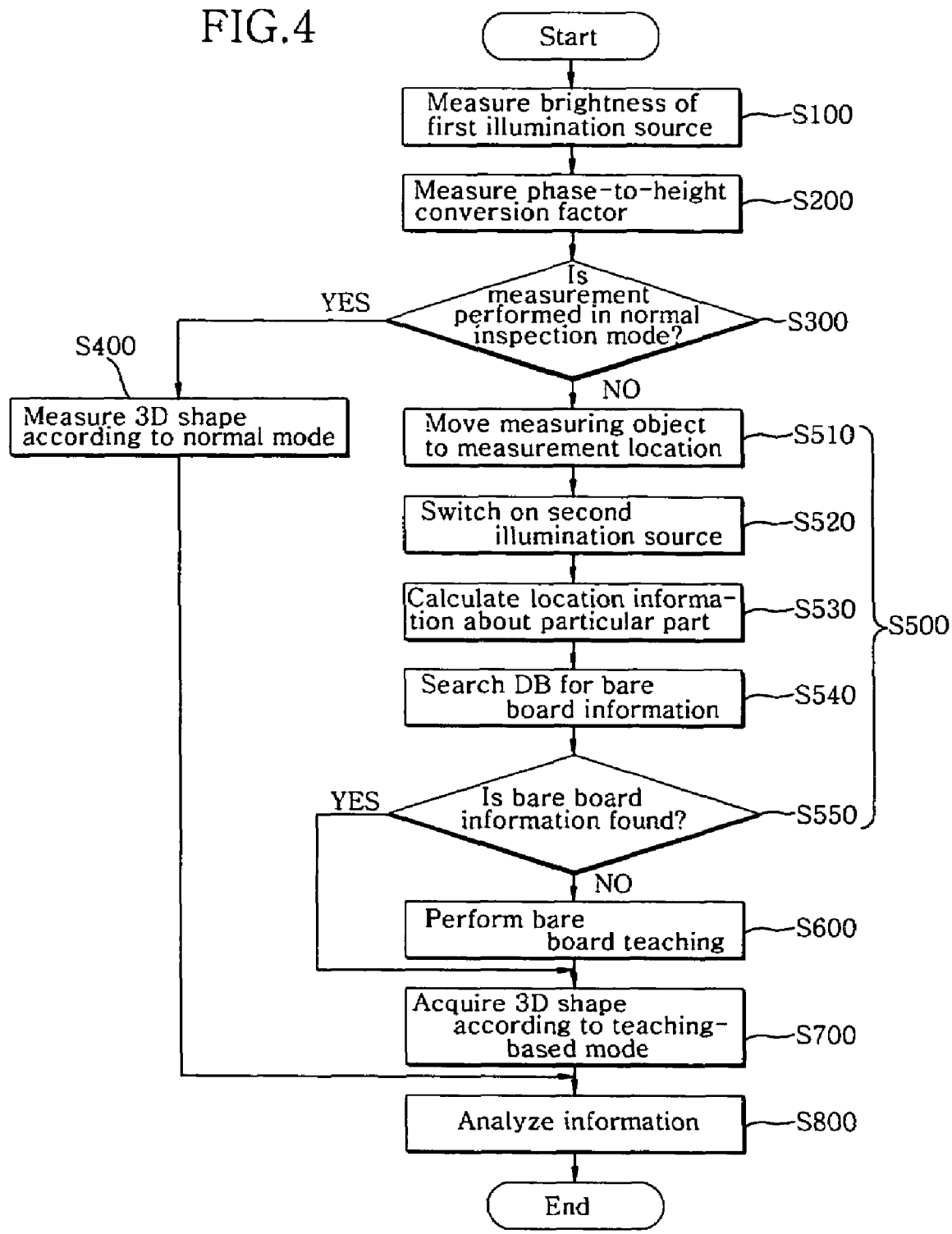
FIG. 4 is a flowchart illustrating a method of measuring a 3D shape according to the present invention.

FIG. 2 is a diagram illustrating a 3D shape measuring system for performing a 3D shape measuring method according to the present invention, FIGS. 3A through 3C illustrate a configuration of a circuit board, a bare board, and a calibration target, and FIG. 4 is a flowchart illustrating a method of measuring a 3D shape according to the present invention.

As shown in FIGS. 2 through 4, an initial setup operation of the 3D shape measuring system, according to the present invention, is performed before measuring the 3D shape of a target object. For the initial setup operation, in operation S100, the central control unit 10 controls the module control unit 20 and the image acquisition unit 30 to measure a brightness of the first illumination source 41a. In operation S200, when the brightness of the first illumination source 41a is completed being measured, the central control unit 10 controls the module control unit 20 and the image acquisition unit 30 to measure a phase-to-height conversion factor. Through operations S100 and S200, the initial setup operation of the 3D shape measuring system is completed.

In operation S300, after the brightness of the first illumination source 41a and the phase-to-height conversion factor have been measured for the initial setup operation of the 3D shape measuring system, the central control unit 10 determines whether the measurement is to be performed in a normal inspection mode. Responsive to an operator selecting a normal inspection mode or a teaching-based inspection mode, by using an input device, such as a keyboard (not shown), to input information or by using a job program pre-installed in the 3D shape measuring system, the central control unit 10 recognizes and determines the selected mode.

In operation S400, when the central control unit 10 determines, in operation S300, that the normal inspection mode was selected, in operation S300, the central control unit 10 controls the module control unit 20 and the image acquisition unit 30 to measure the 3D shape of target objects on the circuit board 62 according to the method of the normal inspection mode. Conversely, when the central control unit 10 determines, in operation S300, that the normal inspection mode was not selected, the central control unit performs operation S500 of searching the database 80 for bare board information for the circuit board 62.

In operation S510 of operation S500, the table controller 21 controls the driving of the table moving device 60 to move the X-Y table 61 and thereby position the circuit board 62 to a measurement location. In operation S520, when the circuit board 62 is positioned at the measurement location, the central control unit 10 controls the illumination controller 23 to switch on the second illumination source 50. In operation S530, when the second illumination source 50 is switched on, the camera 70 takes a picture of the circuit board 62 and the image acquisition unit acquires the image. Then, the central control unit 10 calculates the location information for the particular portion of the circuit board 62. In this instance, the particular portion of the circuit board 62 or the bare board 63 indicates a mark (not shown) that distinguishes each manufacturer or each product using the circuit board 62 or the bare board 63. In operation S540, when the location information for the particular portion of the circuit board 62 is calculated, the central control unit 10 searches the database 80 for bare board information which is identical to the image information of the particular portion of the circuit board 62. In operation S550, it is determined whether the database 80 contains the bare board information for the particular circuit board 62 being currently measured.

In operation 600, when the bare board information is not found in the database 80 in operation S550, the central control unit 10 controls the module control unit 20 and the image acquisition unit 30 to perform a bare board teaching operation.

In operation 700, the central control unit 10 controls the module control unit 20 and the image acquisition unit 30 to measure the 3D shape of target objects on the circuit board 62. When the 3D shape of the circuit board 62 is measured in each of operations S400 and S700, the central control unit 10 analyzes whether the circuit board 62 is normal or abnormal by using information about the measured 3D shape in operation S800 and thereby determine if a solder 62e is bad, which solder was formed on the circuit board 62 after measuring the 3D shape of the bare circuit board 62. As described above, since the 3D shape of target objects on the circuit board 62 is measured according to the normal inspection mode or the teaching-based inspection mode, the 3D shape of target objects on the board may be more readily and efficiently acquired.

Hereinafter, operations S100, S200, S400, S600, and S700 in a method of measuring a 3D shape according to the present invention will be sequentially described in detail.

Figure 5:
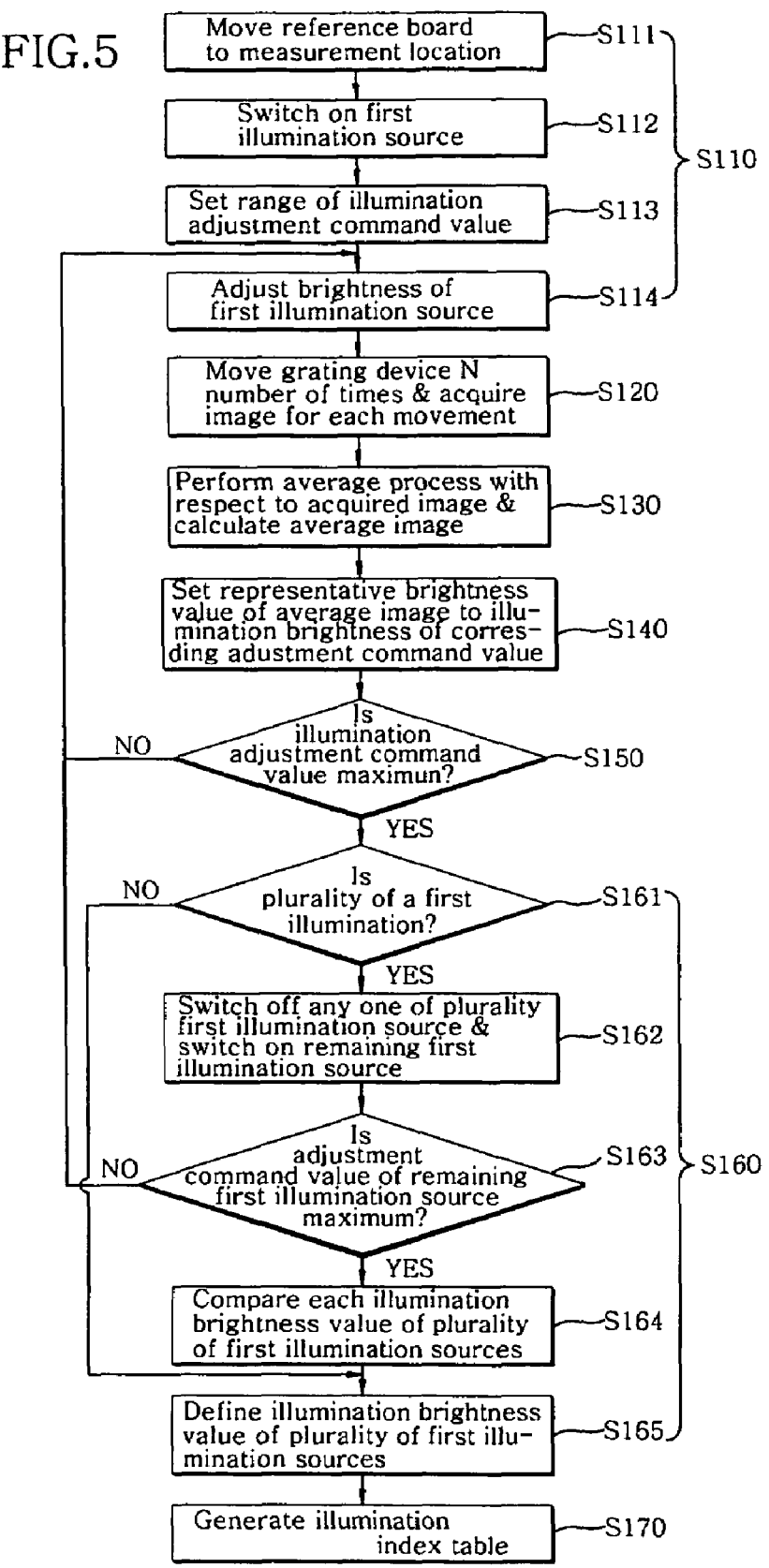
FIG. 5 is a flowchart illustrating an operation of measuring a brightness of a first illumination source shown in FIG. 4.

Referring to FIG. 5, there is shown the method of operation S100. In operation S110, the central control unit 10 sets a range of an illumination adjustment command value and then a brightness of the first illumination source 41a is adjusted by the illumination controller 23 of the module control unit 20 according to the set adjustment command value.

The calibration target 64 is utilized to adjust the brightness of the first illumination source 41a. As shown in FIG. 3C, the calibration target 64 includes a plane surface 64a and a stepped difference 64b, and is formed in a gray color. Also, the calibration target 64 is applied when measuring the brightness of the first illumination source 41a or calculating the phase-to-height conversion factor in the initial setup operation for measuring the 3D shape. In operation S111, to measure the brightness of the first illumination source 41a using the calibration target 64, the table controller 21 of the module control unit drives the table moving device 60 to displace the X-Y table 61 and thereby move the calibration target 64 to a measurement location. In this instance, the measurement location indicates a location where the camera 70 may capture an image of the calibration target 64.

In operation S112, when the calibration target 64 is moved to the measurement location, the first illumination source 41a is switched on by the illumination controller 23 of the module control unit 20. In operation S113, when the first illumination source 41a is switched on, the central control unit 10 sets the ranges of the illumination adjustment command value. In this instance, when a user inputs information about the adjustment command value using an input device, such as a keyboard (not shown), and the like, the central control unit 10 recognizes the input information and sets the range of the adjustment command value. In operation S114, when the range of the illumination adjustment command value is set, the central control unit 10 controls the illumination controller 23 to adjust the brightness of the first illumination source 41a according to the set adjustment command value.

In operation S120, when the brightness of the first illumination source 41a is adjusted, the grating controller 22 of the module control unit 20 is used to drive the grating moving device 42, which moves the grating device 43 an N number of times and the camera 70 captures an image of the calibration target 64 for each movement and the image acquisition unit 30 acquires the image of the calibration target 64. In operation S130, when the image acquisition unit 30 acquires N images of the calibration target 64, the acquired image is received via the image processing board 12 and the interface board 13 of the central control unit 10 and an average-process of the received images is performed, and an average image is calculated. In this instance, the average image process acquires an average image where a grating pattern is eliminated from the N number of images captured by the camera 70 every time the grating device 43 is moved the N number of times to acquire the image of the calibration target 64. In the present invention, the image of the calibration target 64 is acquired by moving the grating device 43 at least four times and the average image process is performed.

In operation S140, when the average image of the calibration target 64 is calculated, the central control unit 10 sets a representative brightness value of the calculated average image to an illumination brightness of a corresponding illumination adjustment command value. In operation S150, when the illumination brightness is set, the central control unit 10 determines whether the adjustment command value is maximum. When the illumination adjustment command value is maximum within the set range of the adjustment command value, the central control unit 10 determines the brightnesss adjustment of the first illumination source 41a is completed.

In operation S160, when the illumination adjustment command value is maximum, the central control unit 10 defines the illumination brightness corresponding to each adjustment command value. In operation S170, when the illumination brightness corresponding to each adjustment command value is defined, the central control unit 10 generates the illumination brightness corresponding to each adjustment command value as an illumination index table. In this instance, the illumination index table defines the illumination brightness according to each adjustment command value. Therefore, when measuring the 3D shape of the circuit board 62 or the bare board 63 by using the first illumination source 41a, the illumination brightness may be linearly adjusted by using the brightness index table, and thus the measurement quality of a 3D shape may be improved.

When a plurality of first illumination sources 41a are provided, as indicated by solid signal lines and dotted signal lines in FIG. 2, in operation S161 of operation S160, the central control unit 10 determines whether the plurality of first illumination sources 41a are provided. In operation S162, when the plurality of first illumination sources 41a are provided, any one of the plurality of first illumination sources 41a is switched on and the remaining first illumination source(s) is switched off.

In operation S163, when the remaining first illumination source 41a is switched on, the central control unit 10 determines whether the adjustment command value of the remaining first illumination source 41a is maximum. In operation S164, when the adjustment command value of the remaining first illumination source 41a is maximum, the central control unit 10 compares the illumination brightness values corresponding to the adjustment command value of any one of the plurality of first illumination sources 41a and the adjustment command value of the remaining first illumination source 41a, and selects a smaller illumination brightness value between them as the brightness of the total illumination system according to each adjustment command value. In operation S165, when the illumination brightness of the total illumination system corresponding to each adjustment command value is determined, the central control unit 10 calculates a new adjustment command value of each first illumination source corresponding to the selected illumination brightness of the total illumination system, and then redefines the illumination adjustment command values of the plurality of first illumination sources 41a corresponding to the selected illumination brightness of the total illumination system. Through the above-described operations, the illumination brightness defined for each adjustment command value is generated into the illumination index table.

Figure 6:
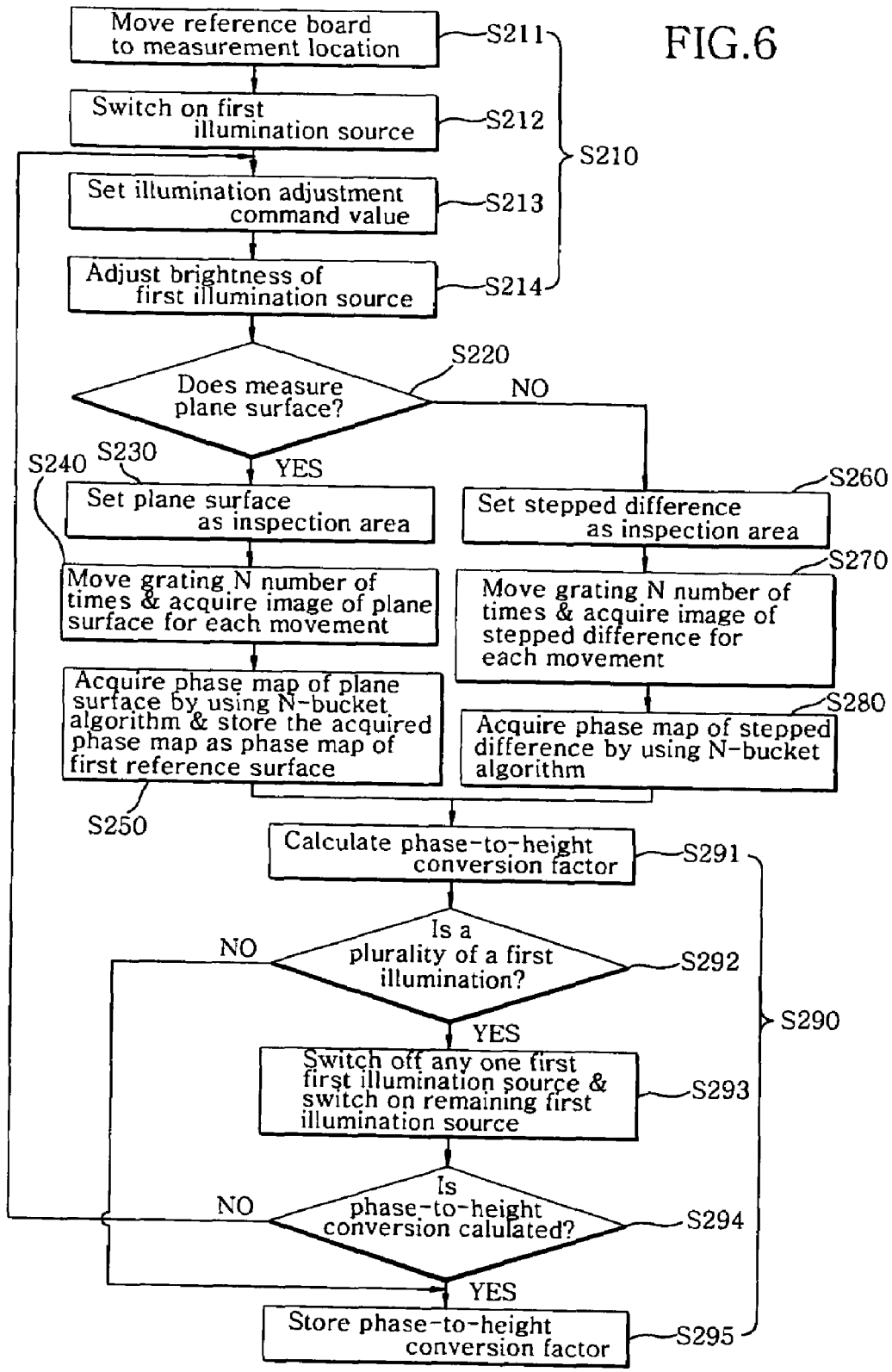
FIG. 6 is a flowchart illustrating an operation of measuring a phase-to-height conversion factor shown in FIG. 4.

In operation S200, when the brightness measurement of the first illumination source 41a is completed, the central control unit 10 controls the module control unit 20 and the image acquisition unit 30 to measure the phase-to-height conversion factor. Referring now to FIG. 6, there is shown the method of measuring the phase-to-height conversion factor. In operation S210 the central control unit 10 controls the illumination controller 23 of the module control unit 20 to adjust the brightness of the first illumination source 41a according to the selected adjustment command value of the total illumination system.

More specifically, to adjust the brightness of the first illumination source, in operation S211, the table controller 21 drives the table moving device to displace the X-Y table 61 and thereby the calibration target 64 is moved to the measurement location. In operation S212, after the calibration target 64 is moved to the measurement location, the first illumination source 41a is switched on by the illumination controller 23. In operation S213, after the first illumination source 41a is switched on, the central control unit 10 selects an adjustment command value. In operation S214, after the adjustment command value is selected, the central control unit 10 controls the illumination controller 23 to adjust the brightness of the first illumination source 41a to the illumination brightness corresponding to the selected adjustment command value.

In operation S220, after the first illumination source is adjusted, the central control unit 10 determines whether a measurement portion of the calibration target 64 corresponds to the plane surface 64a. Whether the measurement portion of the calibration target 64 corresponds to the plane surface 64a is determined by the central control unit 10 by using the image from the camera 70 in a state where the second illumination source 50 is switched on. When the measurement portion of the calibration target 64 does not correspond to the plane surface 64a, the central control unit 10 drives the table moving device 60 to move the plane surface 64a of the calibration target 64 to a focus location of the camera 70 or the plane surface 64a is manually moved by the operator.

In operation S230, after the measurement portion of the calibration target 64 corresponds to the plane surface 64a, the central control unit 10 sets the plane surface 64a of the calibration target 64 as an inspection area. In operation S240, after the plane surface 64a of the calibration target 64 is set as the inspection area, the grating controller 22 drives the grating moving device 42 to move the grating device 43 the N number of times, and emits a grating pattern illumination towards the plane surface 64a for each movement and captures an image of the calibration target via the camera 70, which image is reflected from the plane surface 64a. The image acquisition unit 30 acquires the images of the plane surface 64a from the camera 70. In operation S250, after the image acquisition unit 30 acquires the images of the plane surface 64a, the central control unit 10 acquires a phase map of the plane surface 64a by using an N-bucket algorithm and the acquired images, and also stores the phase map of a first reference surface m.

Information, such as the phase map of the first reference surface m, is stored in a storage device (not shown), such as a hard disk and the like, that connects with the control board 11 of the central control unit 10.

Subsequent to the phase map of the first reference surface m of the plane surface 64a being stored, operation S220 is re-performed. In operation S260, when the measurement portion does not correspond to the plane surface 64a, the central control unit 10 sets a stepped difference 64b of the calibration target 64 as the inspection area. In operation S270, after the stepped difference 64b is set as the inspection area, the grating controller 22 drives the grating moving device 42 to move the grating device 43 the N number of times, emits a grating pattern illumination towards the stepped difference 64b for each movement and an image of the calibration target 64 is captured by the camera 70, which image is reflected from the stepped difference 64b. The image acquisition unit 30 acquires the images of the stepped difference 64b from the camera 70. In operation S280, after the image acquisition unit 30 acquires the images of the stepped difference 64b, the central control unit 10 acquires a phase map of the stepped difference 64b by using an N-bucket algorithm and the acquired images.

In operation S290, after the phase map of each of the plane surface 64a and the stepped difference 64b are acquired in each of operations S250 and S280, the phase-to-height conversion factor of each pixel is calculated and stored by using the acquired phase maps. In this instance, the phase-to-height conversion factor is required to convert a phase into a height value when calculating a phase of each point by using the N-bucket algorithm and then calculating the height value of a corresponding point by using the calculated phase. To calculate the phase-to-height conversion factor of each pixel, the central control unit 10 calculates a relative height phase of the stepped difference 64b with respect to the first reference surface m by using phase information about the first reference surface m and the phase map of the stepped difference 64b. When the relative height phase of the stepped difference 64b is calculated, the central control unit 10 calculates the phase-to-height conversion factor by using the relative height phase of the stepped difference 64b, pattern period information of the stepped difference 64b, and a known height of the stepped difference 64b of the calibration target 64.

Operation S290 is performed with respect to each of the plurality of first illumination sources 41a when a plurality of first illumination sources 41a are provided. More specifically, when the plurality of first illumination sources 41a are provided, in operation S291, the phase-to-height conversion factor of each pixel is calculated by using the phase map, which is acquired using the grating pattern illumination generated from any one of the first illumination sources 41a.

In operation S292, after the phase-to-height conversion factor of each pixel is calculated, the central control unit 10 determines whether a plurality of first illumination sources 41a are provided. In operation S293, after the phase-to-height conversion factor of each pixel with respect to any one of the plurality of first illumination sources 41a is calculated, the central control unit 10 controls the illumination controller 23 of the module control unit 20 to switch off any one of the plurality of first illumination sources 41a where the phase-to-height conversion factor is calculated, and switch on a remaining first illumination source 41a.

In operation S294, the remaining first illumination source 41a is switched on, the central control unit 10 determines whether the phase-to-height conversion factor of each pixel using the grating pattern illumination from the remaining first illumination source 41a is calculated. In operation S295, after the phase-to-height conversion factor of each pixel is calculated, the central control unit 10 stores the phase-to-height conversion factor of each pixel with respect to each of the plurality of first illumination sources 41a.

If the phase-to-height conversion factor of each pixel was not calculated, the central control unit 10 returns to operation S210 for controlling the illumination controller 23 of the module control unit 20 to adjust the brightness of the first illumination source 41a according to the selected adjustment command value.

Subsequent to the illumination index table being generated and the phase-to-height conversion factor being calculated, operation S400, where the 3D shape of target objects on the circuit board 62 are measured according to the normal inspection mode, is performed. The method of operation 400 is detailed in FIGS. 7A and 7B. More specifically, in operation S410 the table controller 201 drives the table moving device 60 to displace the X-Y table 61, and thereby move the circuit board 62 to the measurement location.

In operation S420, after the circuit board 62 is moved to the measurement location, the central control unit 10 controls the illumination controller 23 to adjust the brightness of the first illumination source 41a according to the selected adjustment command value. In operation S430, after the brightness of the first illumination source 41a is adjusted, the central control unit 10 controls the module control unit 20 and the image acquisition unit 30 to acquire the phase map of the circuit board 62, and calculates the relative height phase with respect to a first reference surface m. In operation S440, after the relative height phase with respect to the first reference surface m is calculated, the central control unit 10 calculates a phase histogram by using the relative height phase with respect to the first reference surface m, and calculates the 3D shape of target objects on the circuit board 62 by using the calculated phase histogram.

Figure 7A:
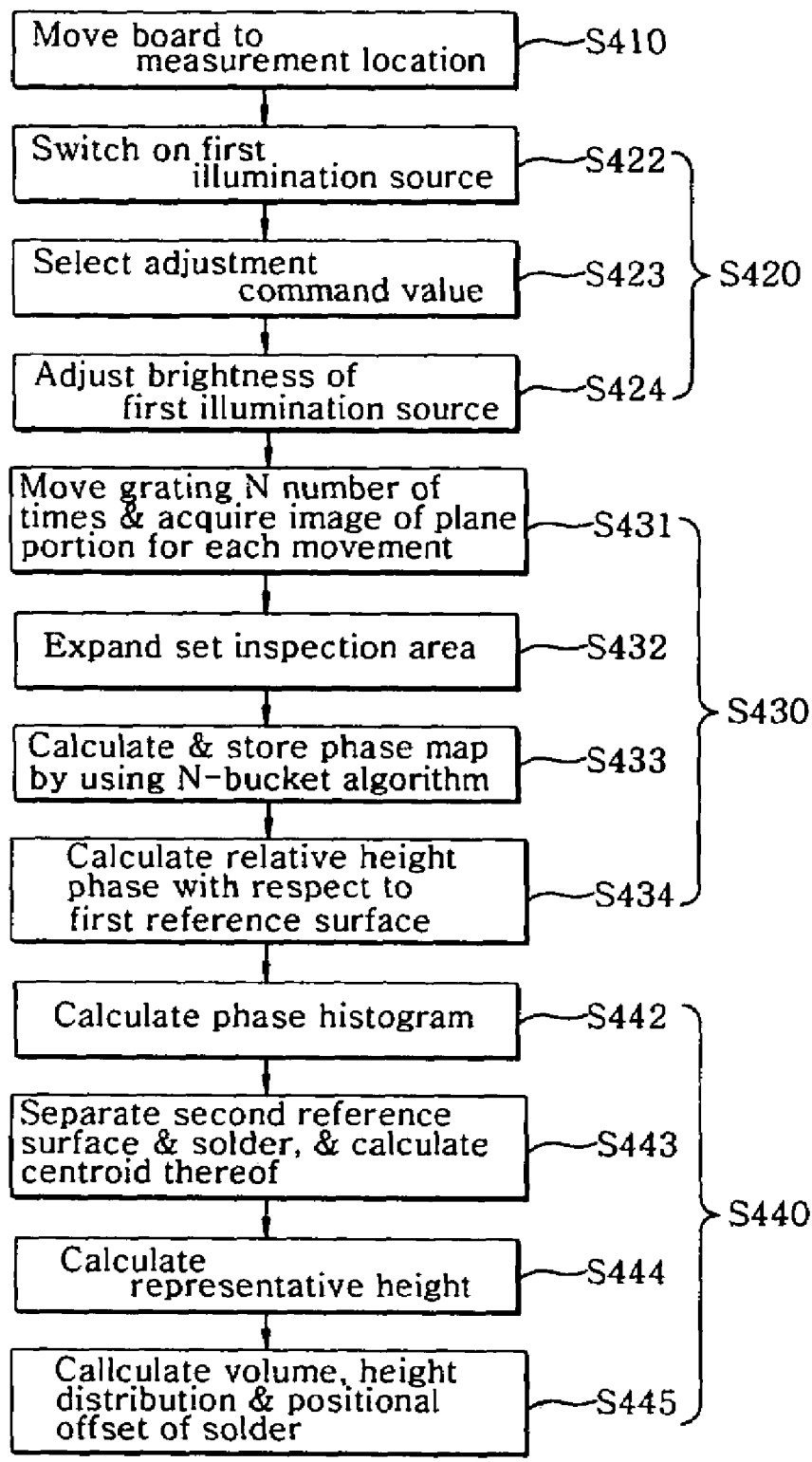

In operation S442 of operation S440 in FIG. 7A, when a single first illumination source 41a is provided, and in this instance, the relative height phase with respect to the first reference surface m of the circuit board 62 using the grating pattern illumination that is generated from the first illumination source 41a is calculated, the central control unit 10 calculates a phase histogram by using the relative height phase with respect to the first reference surface m. In operation S443, after the phase histogram is calculated, the central control unit 10 separates a second reference surface n and a solder 62e from the calculated phase histogram, and calculates a centroid of the second reference surface n and the solder 62e.

In this instance, the method of calculating the centroid of the second reference surface n and the solder 62e initially separates the second reference surface n and the solder 62e by using predetermined dimensional information of the circuit board 62. Subsequent to the second reference surface n being calculated, the central control unit 10 separates the solder 62e by using the calculated second reference surface n. After the second reference surface n and the solder 62e are separated, the central control unit 10 calculates the centroid of the second reference surface n and the solder 62e by using a centroid method.

In operation S444, after the centroid of the second reference surface n and the solder 62e are calculated, the central control unit 10 calculates a representative height of the solder 62e by using the centroid of the second reference surface n and the centroid of the solder 62e. In operation S445, after the representative height of the solder 62e is calculated, the central control unit 10 calculates a volume, a height distribution, and an positional offset of the solder 62e by using the calculated representative height.

Hereinafter, the method steps of operation S440 in FIG. 7B when a plurality of first illumination sources 41a are provided will be described in detail.

In operation S441, when a plurality of first illumination sources 41a are provided, and after the relative height phase with respect to the first reference surface m of the circuit board 62, using the grating pattern illumination generated from any one of the plurality of first illumination sources 41a, is calculated, and the relative height phase with respect to the first reference surface m of the circuit board 62, using the grating pattern illumination generated from the remaining first illumination source 41a is calculated, the central control unit 10 calculates a combined height phase where noise is removed from the relative height phase with respect to the first reference surface m with respect to each of the plurality of first illumination sources 41a, and the calculated combined height phase is stored.

In operation S442, after the combined height phase is stored, the central control unit 10 calculates a phase histogram by using the stored combined height phase, which is the same step as when only the single first illumination source 41a is provided. In operation S443, the central control unit 10 separates the second reference surface n and the solder 62e from the calculated phase histogram, and calculates the centroid of the second reference surface n and the solder 62e. Next, as described above, in operation S444, the central control unit 10 calculates the representative height of the solder 62e by using the centroid of the second reference surface n and the centroid of the solder 62e. In operation S445, after the representative height of the solder 62e is calculated, the central control unit 10 calculates a volume, a height distribution, and an positional offset of the solder 62e by using the calculated representative height.

In this instance, the height distribution of the solder 62e is calculated based on the second reference surface n, and the volume of the solder 62e is calculated by multiplying the phase-to-height conversion factor of each pixel by the phase information of the solder 62e, and summing up the results of the multiplications. Also, the positional offset of the solder 62e is calculated depending upon how far the solder 62e is located from the center of a conductive pad 62d by using location information of the solder 62e which is calculated by using the volume of the solder 62e. Based on the calculated volume, height, distribution and positional offset information of solder, a determination is automatically made as to whether the circuit board is good or bad.

In operation S600, if the bare board information is found to be not present in operation S500, the central control unit 10 controls the module control unit 20 and the image acquisition unit 30 to perform a bare board teaching operation.

Figure 8A:
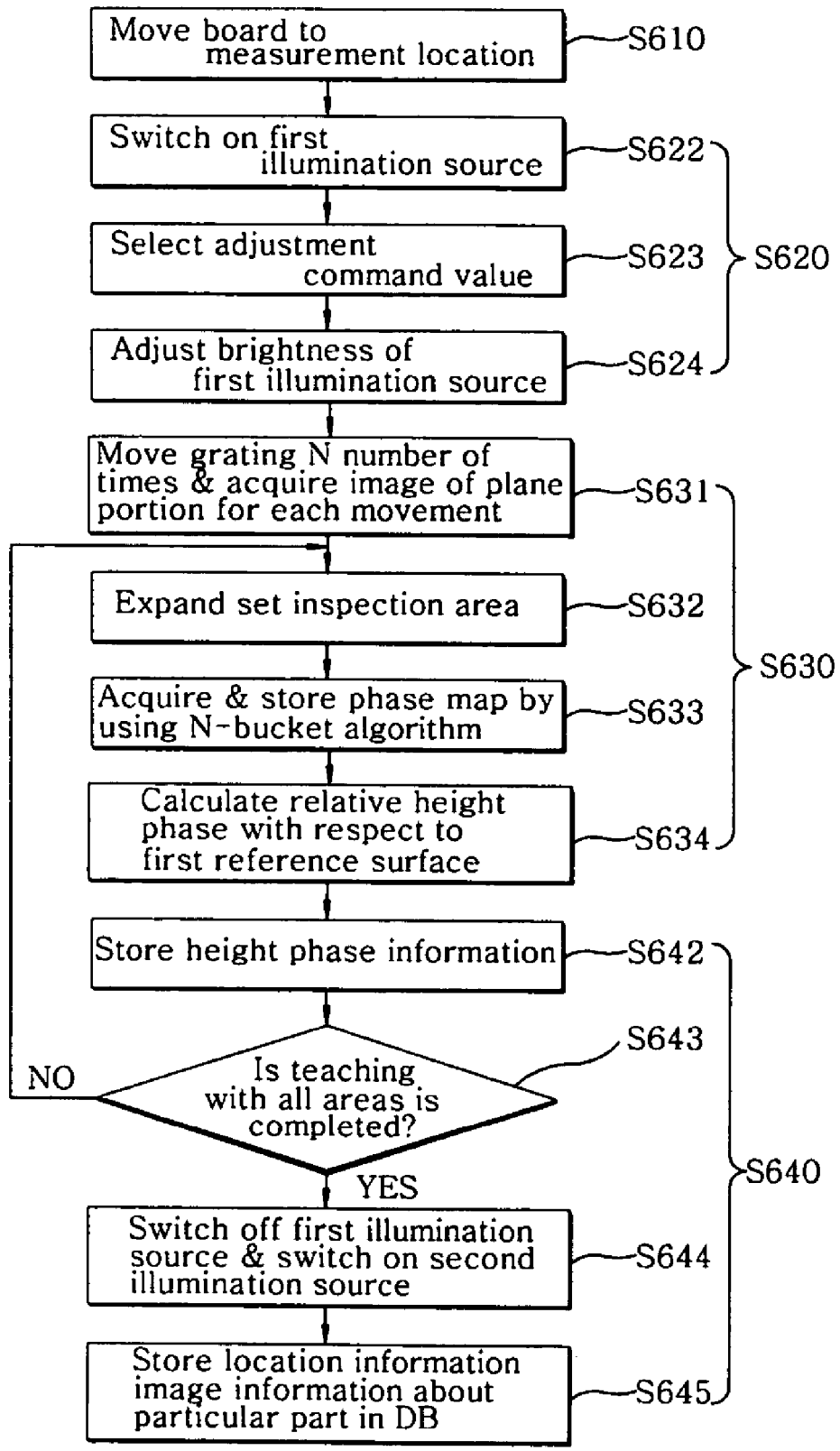
FIGS. 8A and 8B are flowcharts illustrating a bare board teaching operation shown in FIG. 4.
Figure 8B:
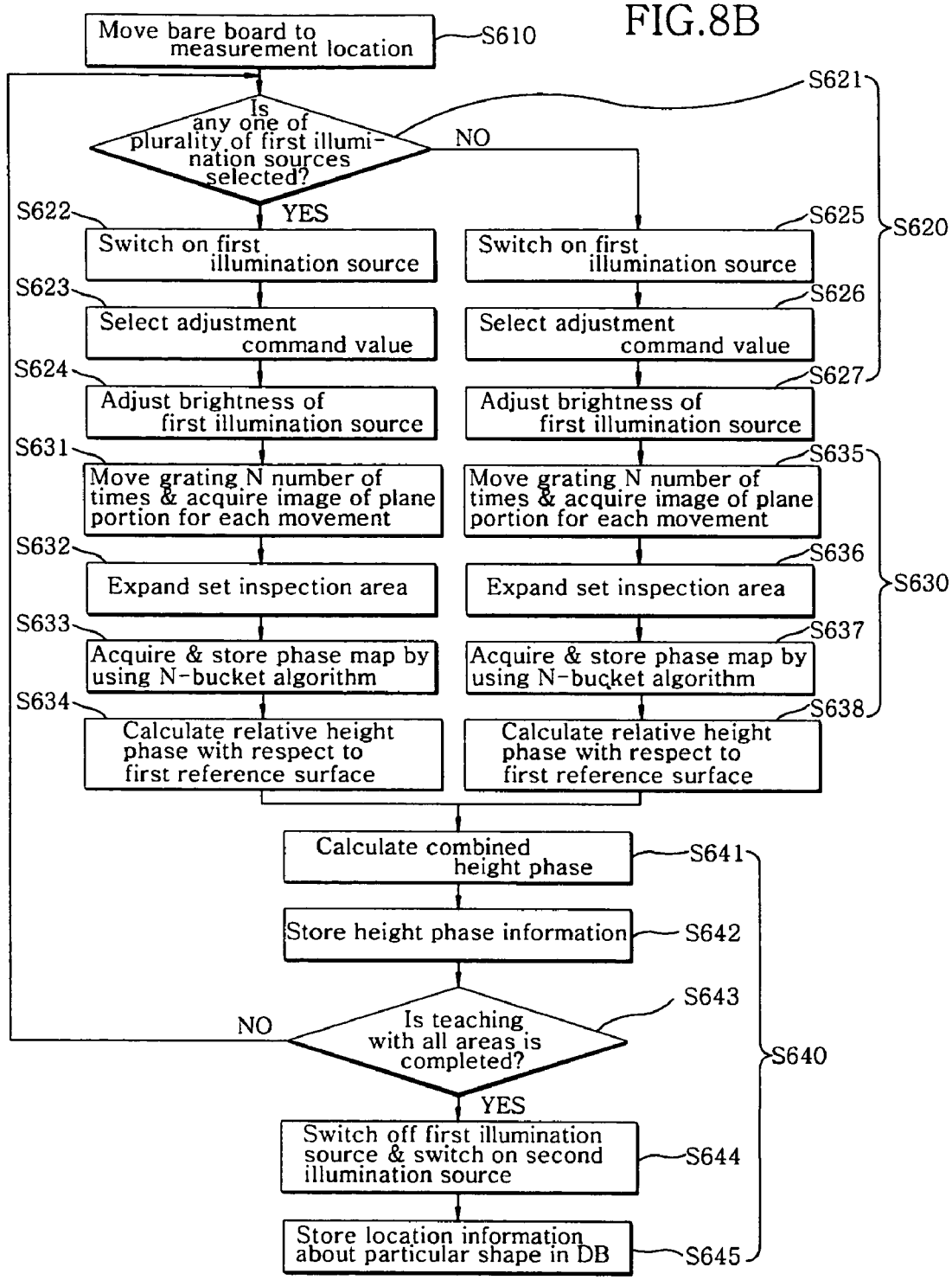

FIGS. 8A and 8B detail the method of the base board teaching operation S600, the bare board 63 is moved to the measurement location. Specifically, in operation S610, the table controller 21 drives the table moving device 60 to displace the X-Y table 61, whereby the bare board 63 is moved to the measurement location. To distinguish the bare board 63 from the circuit board 62, the bare board 63 includes a base plate 62a, a conductive pattern 62b, a solder mask 62c, and the conductive pad 62d.

In operation S620, after the bare board 63 is moved to the measurement location, the central control unit 10 controls the illumination controller 23 to adjust the brightness of the first illumination source 41a according to the selected adjustment command value. In operation S630, after the brightness of the first illumination source 41a is adjusted, the central control unit 10 controls the module control unit 20 and the image acquisition unit 30 to acquire the phase map of the bare board 63, and calculates the relative height phase with respect to the first reference surface m. In this instance, the first reference surface m indicates the base plate 62a of the bare board 63, and is calculated by using predetermined bare board information.

In operation S640, after the relative height phase with respect to the first reference surface m is calculated, the central control unit 10 stores location information and image information about a particular part of the bare board 63, as bare board information, in the database 80.

In this instance, operation S640 may be performed in a different way when only a single first illumination source 41a is provided vs. when a plurality of first illumination sources 41a are provided. Initially, performing operation S640 when the single first illumination source 41a is provided will be described. In operation S642, after the relative height phase with respect to the first reference surface m is calculated, the central control unit 10 stores the relative height phase with respect to the first reference surface m as height phase information of the bare board 63. In operation S643, after the height phase information is stored, the central control unit 10 determines whether teaching with respect to all areas of the base board 63 has been completed. In operation S644, when the teaching with respect to all areas of the bare board 63 has been completed, the central control unit 10 controls the illumination controller 23 of the module control unit 21 to switch off the first illumination source 41a and switch on the second illumination source 50. In operation S645, after the second illumination source 50 is switched on, the central control unit 10 controls the image acquisition unit 30 to acquire the image with respect to the particular part of the bare board 63 using the camera 70, and stores the acquired image, and also calculates location information with respect to the particular part of the bard board 63, and stores the calculated location information and the image information in the database 80.

Hereinafter, performing operation S640 when a plurality of first illumination sources 41a are provided will be described. In this instance, in operation S641, after the relative height phase with respect to the first reference surface m of the bare board 63 using one of the plurality of first illumination sources 41a and the relative height phase with respect to the first reference surface m of the bare board 63 using a remaining one of the first illumination sources 41a are each calculated, the central control unit 10 calculates the combined height phase where noise is removed from the relative height phase with respect to the first reference surface m. Operations after calculating the combined height phase are identical to the operations when only the single first illumination source 41a is provided. In operation S642, after the combined height phase is calculated, the central control unit 10 stores the calculated combined height phase as height phase information.

In operation S643, after the height phase information is stored, the central control unit 10 determines whether teaching with respect to all areas of the bare board 63 has been completed. In operation S644, after the teaching with respect to all areas of the bare board 63 has been completed, the central control unit 10 controls the illumination controller 23 of the module control unit 21 to switch off the plurality of first illumination sources 41a and switch on the second illumination source 50. In this instance, all of the plurality of first illumination sources 41a are switched off. Also, in operation S645, after the second illumination source 50 is switched on, the central control unit 10 controls the image acquisition unit 30 to acquire the image with respect to the particular part of the bare board 63 using the camera 70, and then stores the acquired image, and also calculates location information with respect to the particular part of the bare board 63, and stores the calculated location information in the database 80.

Figure 9A:
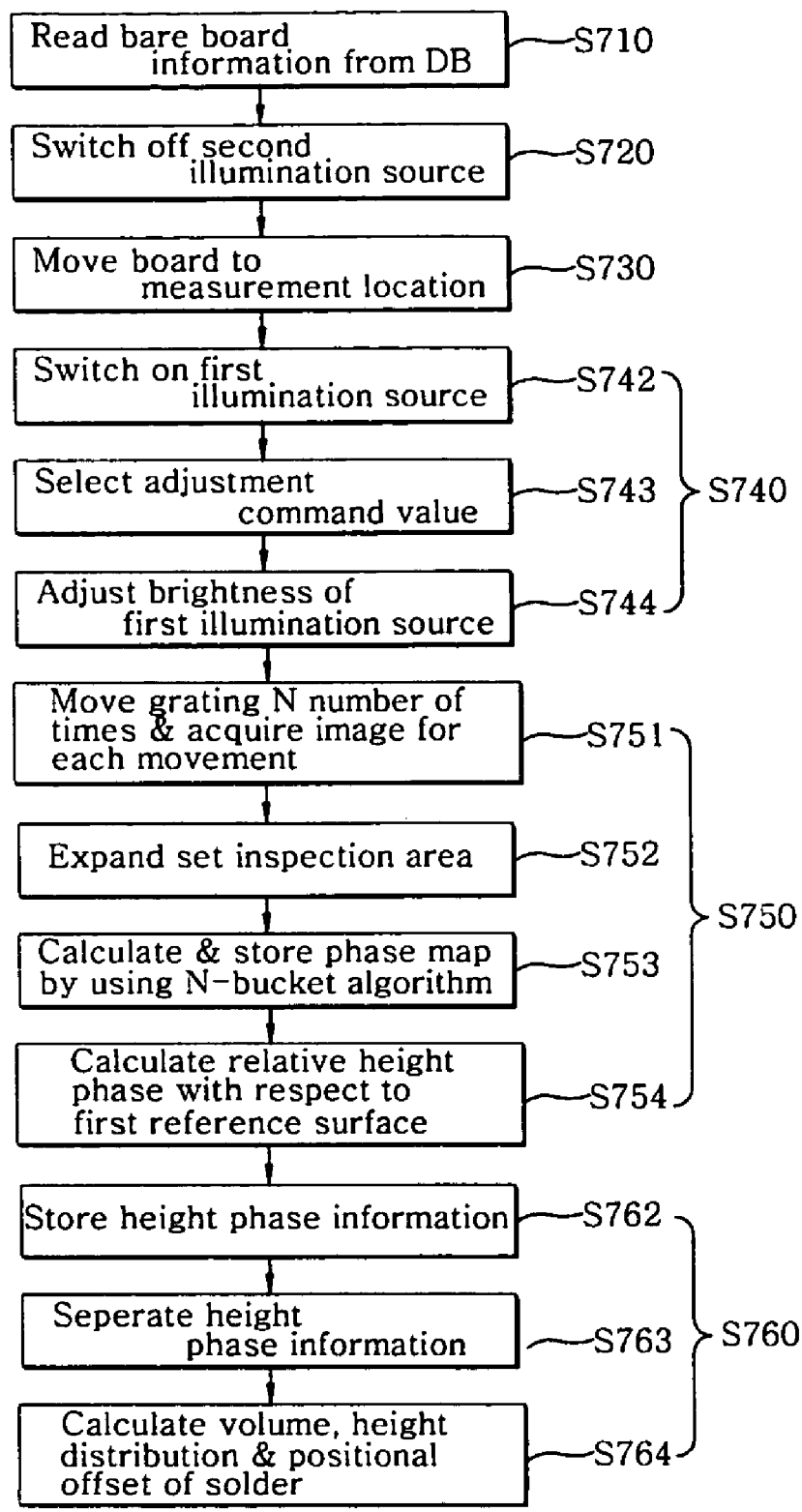
FIGS. 9A and 9B are flowcharts illustrating an operation of measuring a 3D shape of a circuit board according to a teaching-based inspection mode shown in FIG. 4.
Figure 9B:
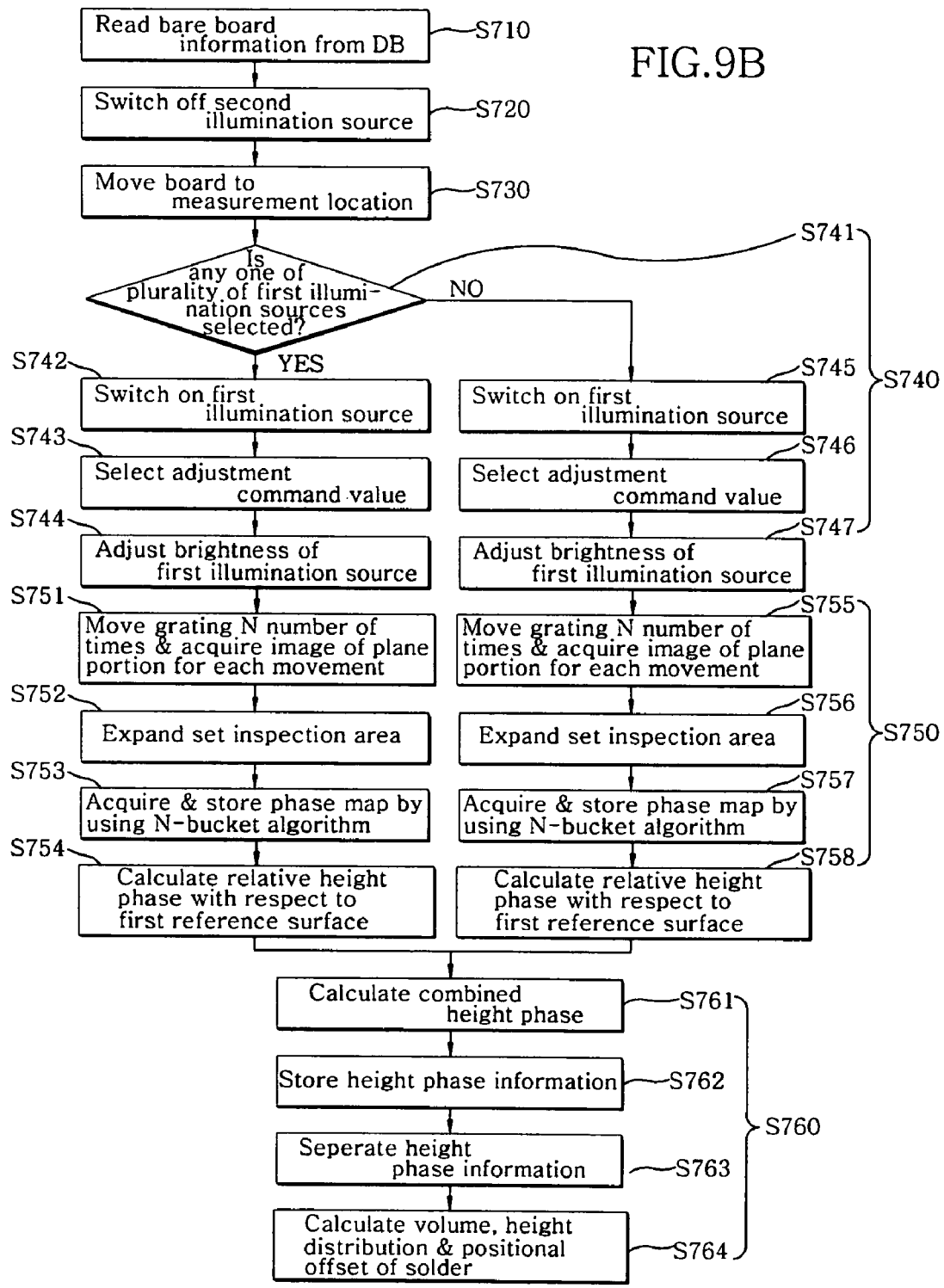

Hereinafter, operation S700 for acquiring the 3D shape of target objects in accordance with the teaching based mode will now be detailed with respect to FIGS. 9A and 9B.

In operation S710 of operation S700, bare board information corresponding to the circuit board 62 is read from the database 80. In operation S720, after the bare board information of the circuit board 62 is read, the central control unit 10 controls the illumination controller 23 of the module control unit to switch off the second illumination source 50 when the second illumination source 50 had been switched on. In operation S730, after the second illumination source 50 is switched off, the table controller 21 drives the table moving device 60 to displace the X-Y table 61 to thereby move the circuit board 62 to the measurement location.

In operation S740, after the circuit board 62 is moved to the measurement location, the central control unit 10 controls the illumination controller 23 to adjust the brightness of the first illumination source 41a according to the selected adjustment command value. In operation S750, after the brightness of the first illumination source 41a is adjusted, the central control unit 10 controls the module control unit 20 and the image acquisition unit 30 to acquire the phase map of the circuit board 62 and calculates the relative height phase with respect to the first reference surface m. In operation S760, after the relative height phase with respect to the first reference surface m is calculated, the central control unit 10 calculates the phase histogram by using the relative height phase with respect to the first reference surface m, and calculates the 3D shape of the circuit board 62.

In this instance, operation S760 may be performed in a different way with respect to when only a single first illumination source 41a is provided vs. when a plurality of first illumination sources 41 are provided.

Initially, performing operation S760 when only the single first illumination source 41a is provided will be described. In operation S762, after the relative height phase with respect to the first reference surface m of the circuit board 62 using the grating pattern illumination generated from the first illumination source 41a is calculated, the central control unit 10 stores the relative height phase with respect to the first reference surface m as height phase information of the circuit board 62. In operation S763, after the height phase information of the circuit board 62 is stored, the central control unit 10 separates height phase information of the solder 62e in a corresponding inspection location by using the height phase information of the bare board 63 in the database 80 and the height phase information of the circuit board 62 stored in operation S762. Subsequent to the height phase information of the solder 62e being separated in the corresponding inspection location, the central control unit 10 calculates actual height information from the relative height phase information of the solder 62e, and calculates a volume, a height distribution, and an positional offset of the solder 62e by using the calculated actual height information. Specifically, in operation S764, after the height phase information of the solder 62e is separated, the central control unit 10 calculates the actual height information from the separated height phase information of the solder 62e, and calculates the volume, the height distribution, and the positional offset of the solder 62e.

Hereinafter, operation S760 will be described for the case where a plurality of first illumination sources 41a are provided. In operation S761, after the relative height phase with respect to the first reference surface m of the circuit board 62 using one of the plurality of first illumination sources 41a and the relative height phase with respect to the first reference surface m of the circuit board 62 using the remaining first illumination source 41a are each calculated, the central control unit 10 calculates a combined height phase where noise is removed from the relative height phase with respect to the first reference surface m. The following operations are identical to the case where only a single first illumination source 41a is provided, and thus only a brief description will be made below.

In operation S762, after the combined height phase is calculated, the central control unit 10 stores the calculated combined height phase as height phase information. In operation S763, following the height phase information being stored, the central control unit 10 separates height phase information of the solder 62e by using the height phase information of the bare board 80 stored in the database 80 and the height phase information of the circuit board 62 stored in operation S762. In operation S764, after the height phase information of the solder 62e is separated, the central control unit 10 calculates actual height information from the separated height phase information of the solder 62e and calculates the volume, the height distribution, and the positional offset of the solder 62e.

In the method of measuring a 3D shape, operations S420, S620, and S740 provide for adjusting the brightness of the first illumination source 41a, to determine if the circuit board 62 is good or bad, and that method will be further described in detail with reference to FIGS. 7A through 9B.

Operations S420, S620, and S740 may be performed in a different way with respect to when a single first illumination source 41a is provided and when a plurality of first illumination sources 41a are provided. Hereinafter, performing operations S420, S620, and S740 when the single first illumination source 41a is provided will be described with reference to FIGS. 7A, 8A, and 9A.

In operations S422, S622, and S742 of operations S420, S620, and S740, the central control unit 10 controls the illumination controller 23 to switch on the first illumination source 41a. In operations S423, S623, and S743, after the first illumination source 41a is switched on, the central control unit 10 selects a predetermined adjustment command value. In operations S424, S624, and S744, subsequent to the adjustment command value being selected, the central control unit 10 controls the illumination controller 23 to adjust the brightness of the first illumination source 41a according to the selected adjustment command value.

Hereinafter, operations S420, S620, and S740 will be described for the case where a plurality of first illumination sources 41a are provided with reference to FIGS. 7B, 8B, and 9B.

In operations S421, S621, and S741 of operations S420, S620, and S740, the central control unit 10 determines whether any one of the plurality of first illumination sources 41a is selected. In operations S422, S622, and S722, after the selected first illumination source 41a is determined, the central control unit 10 controls the illumination controller 23 to switch on the selected first illumination source 41a. In operations S423, S623, and S743, after the selected first illumination source 41a is switched on, the central control unit 10 selects the predetermined adjustment command value. In operations S424, S624, and S744, following the adjustment command value being selected, the central control unit controls the illumination controller 23 to adjust the brightness of the first illumination source 41a according to the selected adjustment command value.

In operations S425, S625, and S745, after the one of the plurality of first illumination sources 41a is no longer selected, the central control unit 10 controls the illumination controller 23 to switch on the remaining first illumination source 41a. In operation S426, S626, and S746, after the remaining first illumination source 41a has been switched on, the central controls unit 10 selects the predetermined adjustment command value. In operations S427, S627, and S747, following the adjustment command value being selected, the central control unit 10 controls the illumination controller 23 to adjust the brightness of the remaining first illumination source 41a according to the selected adjustment command value.

Subsequent to the brightness of the first illumination source 41a having been adjusted, operations S430, S630, and S750 for calculating the relative height phase with respect to the first reference surface m are respectively performed. In this instance, operations S430, S630, and S750 may be performed in a different way with respect to when a single first illumination source 41a is provided vs. when a plurality of first illumination sources 41a are provided. Hereinafter, details for performing operations S430, S630, and S750 when the single first illumination source 41a will be described with reference to FIGS. 7A, 8A, and 9A.

In operations S431, S631, and S751, after the brightness of the first illumination source 41a is adjusted, the grating controller 22 drives the grating moving device 42 to move the grating device 43 the N number of times and the camera 70 captures the reflected image of the emitted grating pattern illumination generated from the first illumination source 41a in correspondence with each movement, and the image acquisition unit 30 acquires the image from the camera 70. In operations S432, S632, and S752, after the image acquisition unit 30 acquires the image, an inspection area is expanded. A concept of expanding the inspection area is applied to calculate the height of the solder 62e based on the second reference surface n of the circuit board 62 that includes the conductive pattern 62b, the solder mask 62c, the conductive pad 62d, and the solder 62e, which are formed on the base plate 62a, as shown in FIG. 3A. In this instance, the second reference surface n indicates the height from a bottom surface of the circuit board 62 to a top surface of the solder mask 62c and the conductive pad 62d, and the height corresponding to a centroid from the first reference surface m to the solder mask 62c and the conductive pad 62d. Also, as shown in FIGS. 3A and 3B, when an area A is set as the inspection area of the circuit board 62 or the bare board 63 and the inspection is started, the inspection area is expanded to an area B so as to calculate a height value of the second reference value n.

In operations S433, S633, and S753, after the image acquisition unit 30 acquires the image in operations S431, S631, and S751, the central control unit 10 calculates a phase map by using an N-bucket algorithm, and stores the calculated phase map. In operations S434, S634, and S754, following the phase map being calculated and stored, the central control unit 10 calculates the relative height phase with respect to the first reference surface m in a corresponding inspection location by using a difference between a predetermined phase map of the first reference surface m and the phase map stored in the central control unit 10.

Hereinafter, details of performing operations S430, S630, and S750 when a plurality of first illumination sources 41a are provided will be described with reference to FIGS. 7B, 8B, and 9B.

In operations S431, S631, and S751, after the brightness of any one of the plurality of first illumination sources 41a is adjusted, the grating controller 22 drives the grating moving device 42 to move the grating device 43 the N number of times and the camera 70 captures a reflected image of the emitted grating pattern illumination generated from the first illumination source 41a in correspondence with each movement, and the image acquisition unit 30 acquires the image from camera 70. In operations S432, S632, and S752, after the image acquisition unit 30 acquires the image, an inspection area is expanded. In operations S433, S633, and S753, after the image acquisition unit 30 acquires the image in operations S431, S631, and S751, the central control unit 10 calculates a phase map by using an N-bucket algorithm and stores the calculated phase map. In operations S434, S634, and S754, following the phase map being calculated and stored, the central control unit 10 calculates the relative height phase with respect to the first reference surface m in a corresponding inspection location by using a difference between a predetermined phase map of the first reference surface m and the phase map stored in the central control unit 10.

In operations S435, S635, and S755, after the brightness of the remaining first illumination source 41a is adjusted, the grating controller 22 drives the grating moving device 42 to move the grating device 43 the N number of times and the camera 70 captures the reflected image of the emitted grating pattern illumination generated from the remaining first illumination source 41a in correspondence with each movement, and the image acquisition unit 30 acquires the image from camera 70. When the image using the remaining first illumination source 41a has been acquired by the image acquisition unit 30, the relative height phase using the remaining first illumination source 41a is calculated by performing operations S436, S636, and S756 for expanding the inspection area, operations S437, S637, and S757 for calculating and storing the phase map using N-bucket algorithm, and operations S438, S638, and S758 for calculating the relative height phase with respect to the first reference surface m.

When the relative height phase is calculated with respect to the case where a single first illumination source 41a is provided in the 3D shape measuring system and the case where a plurality of first illumination sources 41a are provided therein, the 3D shape of target objects on the circuit board 62 can be measured by using the calculated relative height phase. Also, whether the solder 62e on the circuit board 62 is good or bad can be determined by using the result of the measurement.

According to the present invention, there is provided a method of measuring a 3D shape which can measure 3D shape of target objects on a circuit board in a normal inspection mode when a measuring object is set to the normal inspection mode, and can also measure the 3D shape of target objects on the board by searching a database for bare board information when the measuring object is not set to the normal inspection mode, or by performing bare board teaching when the circuit board is supplied from a supplier not having the bare board information, and thereby can improve a productivity of electric circuit boards.

Also, according to the present invention, measurement quality of a 3D shape is improved by measuring the 3D shape while maintaining a brightness of an illumination source, which is applied to measure the 3D shape, to be standardized for each operation.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of measuring a 3 dimensional (3D) image of a circuit board, the method comprising the steps of:
   establishing a correspondence between illumination adjustment command values and a brightness of a first illumination source by controlling a module control unit and an image acquisition unit through a central control unit for each of a plurality of illumination adjustment command values;
   establishing a phase-to-height conversion factor by controlling the module control unit and the image acquisition unit to obtain image data from a plurality of images captured by a camera coupled to the image acquisition unit;
   determining whether a measurement is to be performed in a normal inspection mode or a teaching mode;
   in the normal inspection mode, measuring a 3D shape of target objects on the circuit board by controlling the module control unit and the image acquisition unit through the central control unit;
   in the teaching mode, establishing height data for a bare circuit board by controlling the module control unit and the image acquisition unit through the central control unit;
   following establishment of the height data for a bare circuit board, measuring the 3D shape of target objects on the circuit board by controlling the module control unit and the image acquisition unit through the central control unit; and
   analyzing the measured 3D shape of target objects on the circuit board in the central control unit whether the 3D shape of the target objects is one of normal or abnormal.

2. The method of claim 1, wherein the step of establishing a correspondence between illumination adjustment command values and a brightness of the first illumination source comprises the steps of:
   adjusting a brightness of the first illumination source by an illumination controller of the module control unit for each of a plurality of illumination adjustment command values output by the central control unit;
   acquiring a plurality of images of a calibration target from the camera coupled to the image acquisition unit for each illumination adjustment command value, the plurality of images being captured in correspondence with projection of a grating onto the calibration target and successively moved relative to the calibration target an N number of times and capturing an image thereof via the camera for each movement;
   receiving the acquired images via an interface board and an image processing board of the central control unit and then performing an averaging process with respect to the received images for each illumination adjustment command value, and calculating an average image for each illumination adjustment command value;
   setting a representative brightness value based on the calculated average image as an illumination brightness for each corresponding illumination adjustment command value; and
   generating an illumination index table defining the illumination brightness corresponding to each illumination adjustment command value.

3. The method of claim 2, wherein the step of adjusting of a brightness of the first illumination source comprises the steps of:

driving an X-Y table to move the calibration target to a measurement location;

switching on the first illumination source when the calibration target has been moved to the measurement location;

setting a range of the illumination adjustment command values; and adjusting the brightness of the first illumination source according to each illumination adjustment command value by controlling the illumination controller.

4. The method of claim 2, further comprising the steps of:

determining that a plurality of first illumination sources are provided;

switching off the first illumination source for which a correspondence between the illumination adjustment command values and the brightness was first established and switching on a remaining one of the plurality of first illumination sources;

comparing an illumination brightness corresponding to the illumination adjustment command values for the first illumination source for which a correspondence between the illumination adjustment command values and the brightness was first established with an illumination brightness corresponding to the illumination adjustment command values of the remaining first illumination source, selecting a lower illumination brightness therebetween as a brightness of a total illumination system for each illumination adjustment command value, and calculating a new illumination adjustment command value of each first illumination source corresponding to a selected illumination brightness of the total illumination system; and redefining each of the illumination adjustment command values of the plurality of first illumination sources to correspond to the respective selected illumination brightness of the total illumination system.

5. The method of claim 1, wherein the step of establishing a phase-to-height conversion factor comprises the steps of:

a. adjusting the brightness of the first illumination source according to a selected illumination adjustment command value;

b. setting a plane surface of a calibration target as an inspection area;

c. acquiring images of the plane surface of the calibration target from the acquisition unit, the images including a grating pattern projected onto the plane surface, the images being acquired concurrently with successively moving the projected grating pattern relative to the plane surface an N number of times;

d. generating a phase map of the plane surface from the acquired images using an N-bucket algorithm, and storing the phase map as a phase map of a first reference surface;

e. setting a stepped surface difference of the calibration target as the inspection area;

f. acquiring images of the stepped surface difference of the calibration target from the acquisition unit, the images including the grating pattern projected onto the stepped surface difference, the images being acquired concurrently with successively moving the projected grating pattern relative to the plane surface the N number of times;

g. generating a phase map of the stepped surface difference from the acquired images of the stepped surface difference using the N-bucket algorithm; and h. calculating a phase-to-height conversion factor of each pixel of the acquired images of the stepped surface difference using the generated phase maps, and storing the calculated phase-to-height conversion factor.

6. The method of claim 5, wherein the step of adjusting of the brightness of the first illumination source comprises the steps of:

moving the calibration target to the measurement location by a table controller driving a table moving device to displace an X-Y table;

switching on the first illumination source;

selecting the illumination adjustment command value; and adjusting the brightness of the first illumination source to the illumination brightness corresponding to the selected illumination adjustment command value.

7. The method of claim 5, further comprising the steps of:

determining that a plurality of first illumination sources are provided; and repeating steps a-h for the remaining first illumination source.

8. The method of claim 1, further comprising the steps of:

moving the circuit board to a measurement location by displacing an X-Y table;

switching on a second illumination source by controlling an illumination controller;

calculating location information and storing image information with respect to a particular part of the circuit board being imaged by the camera;

searching a database for bare circuit board information which is identical to the calculated location information and image information of the particular part of the board being imaged; and determining bare circuit board information being included in the database responsive to the calculated location information and image information matching location information and image information stored in the database.

9. The method of claim 5, wherein the step of measuring the 3D shape of target objects on the circuit board comprises the steps of:

moving the circuit board to a measurement location by driving a table moving device to displace an X-Y table;

adjusting the brightness of the first illumination source according to a selected illumination adjustment command value by controlling an illumination controller;

generating a phase map of the circuit board and calculating a relative height phase with respect to a first reference surface by controlling the module control unit and the image acquisition unit; and calculating a phase histogram using the calculated relative height phase with respect to the first reference surface and calculating the 3D shape of target objects on the board using the calculated phase histogram.

10. The method of claim 9, wherein the steps of calculating a relative height phase, calculating a phase histogram, and calculating of the 3D shape of target objects on the board further comprise the steps of:

calculating the phase histogram using the relative height phase with respect to the first reference surface subsequent to calculating the relative height phase with respect to the first reference surface of the circuit board in accordance with the projected grating pattern from the first illumination source;

separating a second reference surface and a solder from the calculated phase histogram and calculating a centroid of each of the second reference surface and the solder;

calculating a representative height of the solder by using the centroid of the second reference surface and the centroid of the solder; and calculating a volume, a height distribution, and an positional offset of the solder using the calculated representative height of the solder.

11. The method of claim 9, wherein the steps of calculating a relative height phase, calculating a phase histogram, and calculating of the 3D shape of target objects on the board further comprise the steps of:

calculating and storing a combined height phase where noise is removed from the relative height phase with respect to the first reference surface of the circuit board when a plurality of first illumination sources are provided, the combined height phase being a combination of the calculated relative height phase with respect to the first reference surface of the circuit board in accordance with the projected grating pattern from one of the plurality of first illumination sources and the calculated relative height phase with respect to the first reference surface of the circuit board in accordance with the projected grating pattern from the remaining first illumination source;

calculating the phase histogram by using the stored combined height phase;

separating a second reference surface and a solder from the calculated phase histogram and calculating a centroid of each of the second reference surface and the solder;

calculating a representative height of the solder by using the centroid of the second reference surface and the centroid of the solder; and calculating a volume, a height distribution, and an positional offset of the solder by using the calculated representative height of the solder.

12. The method of claim 1, wherein the step of establishing height data for a bare circuit board in the teaching mode comprises the steps of:

moving the bare circuit board to a measurement location, the bare circuit board being disposed on an X-Y table displaced by a table moving device driven by a table controller;

adjusting the brightness of the first illumination source according to a selected adjustment command value by controlling the illumination controller through the central control unit;

generating a phase map of the bare circuit board and calculating a relative height phase with respect to a first reference surface by controlling the module control unit and the image acquisition unit following adjustment of the brightness of the first illumination source; and storing location information and image information about a particular part of the bare circuit board, the image information being an image reflected from the bare circuit board using illumination generated from the second illumination source and captured by the camera.

13. The method of claim 12, wherein the step of storing of the location information comprises the steps of:

storing the relative height phase with respect to the first reference surface as height phase information of the bare circuit board;

determining whether height data has been establish for all areas of the bare circuit board in the teaching mode following storage of the height phase information;

switching off the first illumination source and switching on the second illumination source by controlling the illumination controller of the module control unit subsequent to height data having been establish for all areas of the bare circuit board; and acquiring and storing an image of a particular part of the bare circuit board via the camera, and calculating the location information about the particular part of the bare circuit board by using the stored image and the height phase information, the calculated location information being stored as the bare circuit board information in a database.

14. The method of claim 12, wherein the step of storing of the location information comprises steps of:

calculating a combined height phase where noise is removed from the relative height phase with respect to the first reference surface of the circuit board when a plurality of first illumination sources are provided, the combined height phase being a combination of the calculated relative height phase with respect to the first reference surface of the bare circuit board using one of the plurality of first illumination sources and the calculated relative height phase with respect to the first reference surface of the bare circuit board using the remaining first illumination source;

storing the combined height phase as the height phase information;

determining whether height data has been establish for all areas of the bare circuit board in the teaching mode following storage of the height phase information;

switching off the first illumination source and switching on the second illumination source by controlling the illumination controller of the module control unit subsequent to height data having been established for all areas of the bare circuit board; and acquiring and storing an image of a particular part of the bare circuit board via the camera, and calculating the location information about the particular part of the bare circuit board by using the stored image and the height phase information, the calculated location information being stored as the bare circuit board information in a database.

15. The method of claim 1, wherein the step of measuring a 3D shape of target objects on the circuit board comprises the steps of:

reading a database for bare circuit board information corresponding to the circuit board;

moving the circuit board disposed on an X-Y table to a measurement location by using a table controller to drive a table moving device and thereby displace the X-Y table;

adjusting a brightness of the first illumination source according to a selected illumination adjustment command value;

generating a phase map of the circuit board and calculating a relative height phase with respect to a first reference surface by controlling the module control unit and the image acquisition unit following adjustment of the brightness of the first illumination source; and calculating a phase histogram using the relative height phase with respect to the first reference surface, and measuring the 3D shape of target objects on the board using the calculated phase histogram.

16. The method of claim 15, wherein the steps of calculating of the phase histogram and the measuring of the 3D shape of target objects on the circuit board further comprise the steps of:

storing the relative height phase with respect to the first reference surface as height phase information of the circuit board, the calculated relative height phase being with respect to the first reference surface of the circuit board in accordance with a projected grating pattern from the first illumination source;

separating height phase information of a solder by using the height phase information of the circuit board and the height phase information of the bare circuit board stored in the database; and calculating actual height information from the separated height phase information of the solder, and calculating a volume, a height distribution, and a positional offset of the solder.

17. The method of claim 15, wherein the step of measuring of the 3D shape of target objects on the circuit board further comprises the steps of:

calculating a combined height phase where noise is removed from the relative height phase with respect to the first reference surface of the circuit board when a plurality of first illumination sources are provided, the combined height phase being a combination of the calculated relative height phase with respect to the first reference surface of the circuit board using one of the plurality of first illumination sources and the calculated relative height phase with respect to the first reference surface of the circuit board using the remaining first illumination source;

storing the combined height phase as height phase information;

separating height phase information of a solder by using the height phase information of the circuit board and height phase information of the bare circuit board stored in the database; and calculating actual height information from the height phase information of the solder and calculating a volume, a height distribution, and a positional offset of the solder.

18. The method of claim 9, 12, or 15, wherein the step of adjusting the brightness of the first illumination source comprises the steps of:

switching on the first illumination source by controlling the illumination controller;

selecting an illumination adjustment command value; and adjusting the brightness of the first illumination source to an illumination brightness according to the selected illumination adjustment command value by controlling the illumination controller.

19. The method of claim 9, 12, or 15, wherein the step of adjusting the brightness of the first illumination source comprises the steps of:

determining whether one of a plurality of first illumination sources is selected;

switching on the selected first illumination source by controlling the illumination controller;

selecting an illumination adjustment command value;

adjusting the selected first illumination source to an illumination brightness according to the selected illumination adjustment command value by controlling the illumination controller;

switching on a remaining first illumination source by controlling the illumination controller;

selecting the illumination adjustment command value; and adjusting the remaining first illumination source to the illumination brightness according to the selected illumination adjustment command value by controlling the illumination controller.

20. The method of claim 9, 12, or 15, wherein the step of calculating the relative height phase comprises the steps of:

acquiring images responsive to moving a grating device an N number of times, and projecting a grating pattern from the first illumination source in correspondence with each movement;

expanding an inspection area to repeat the acquiring of the images;

calculating and storing the phase map using an N-bucket algorithm; and calculating the relative height phase with respect to the first reference surface of the circuit board in a corresponding inspection location using a difference between the phase map of the first reference surface and the phase map stored in the central control unit.

21. The method of claim 9, 12, or 15, wherein the step of calculating the relative height phase comprises the steps of:

acquiring images responsive to moving a grating device an N number of times, and projecting a grating pattern from one of a plurality of first illumination sources in correspondence with each movement;

expanding an inspection area to repeat the acquiring of the images;

calculating and storing the phase map by using an N-bucket algorithm;

calculating the relative height phase with respect to the first reference surface in a corresponding inspection location by using a difference between the phase map of the first reference surface and the stored phase map;

acquiring images responsive to moving the grating device the N number of times, and projecting the grating pattern from the remaining first illumination source; and repeating the expanding of the inspection area, the calculating and storing of the phase map, and the calculating of the relative height phase using the N-bucket algorithm.

* * * * *